UNITED STATES PATENT OFFICE.

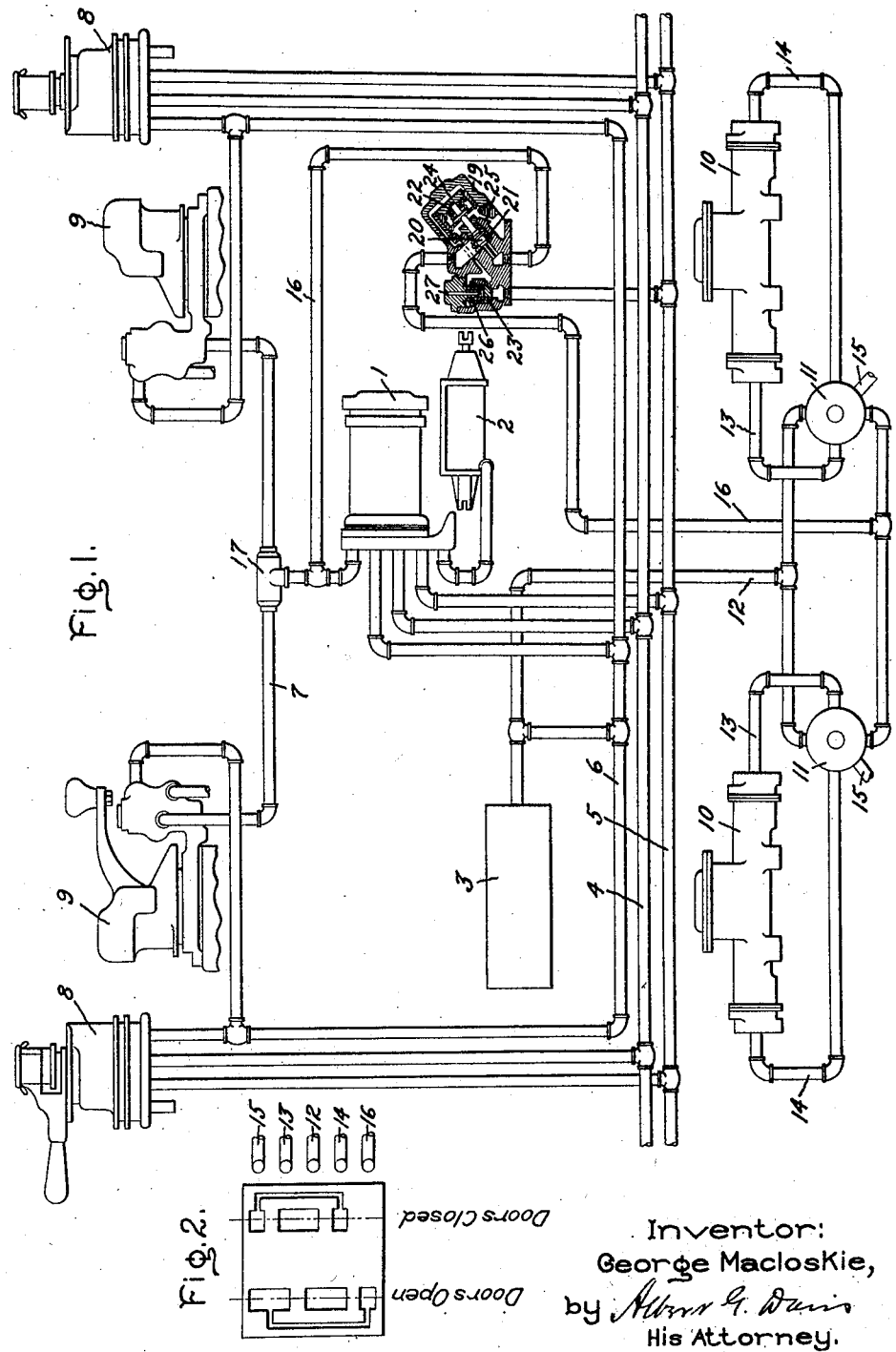

GEORGE MACLOSKIE, OF ERIE, PENNYSLVANIA, ASSIGNOR TO GENERAL ELECTRIC COMPANY, A CORPORATION OF NEW YORK.

COMBINED AIR-BRAKE AND CAR-DOOR-OPERATING EQUIPMENT.

1,408,111.       Specification of Letters Patent.    Patented Feb. 28, 1922.

Application filed April 14, 1921. Serial No. 461,293.

*To all whom it may concern:*

Be it known that I, GEORGE MACLOSKIE, a citizen of the United States, residing at Erie, county of Erie, State of Pennsylvania, have invented certain new and useful Improvements in Combined Air-Brake and Car-Door-Operating Equipments, of which the following is a specification.

My invention relates to combined air brake and car door operating equipments.

Where the car doors are adapted to be controlled by a separate door valve instead of by means of the motorman's brake valve, it is very desirable to provide an arrangement for interlocking the air brake equipment with the car door operating equipment so that the brakes are always applied when the car doors are open and one object of my invention is to provide a new and simple arrangement for accomplishing this result.

Another object of my invention is to provide a combined air brake and car door operating equipment in which an emergency application of the brakes is produced if the doors are opened before the brakes are applied, and in which a straight air application of the brakes, before the doors are opened, prevents an emergency application of the brakes when the doors are opened.

My invention will be better understood from the following description taken in connection with the accompanying drawing, and its scope will be pointed out in the appended claims.

In the accompanying drawing, Fig. 1 is a diagrammatic view partly in section of a combined car door operating, air brake and safety control equipment embodying my invention; and Fig. 2 is a diagrammatic development of a door valve which may be used.

As shown in Fig. 1 of the drawing, the air brake and safety car control equipment may comprise an emergency valve 1, a brake cylinder 2, a main reservoir 3, an emergency brake pipe 4, a straight air pipe 5, a main reservoir pipe 6, a safety control pipe 7 and in a double-end equipment, at each end of the car, a brake valve 8 and a controller handle 9 of the well known type in which the removal of the operator's hand from the handle causes fluid to be vented from the safety control pipe 7, which in turn causes a relay valve in the emergency valve to operate to vent fluid from the emergency brake pipe to effect an emergency application of the brakes. The above equipment is standard apparatus and is well known in the art and therefore a complete description thereof is deemed unnecssary.

The door operating equipment shown in the drawing comprises two door engines 10, which may be arranged to operate different car doors, and a door valve 11 of any suitable type for controlling each door engine. These door valves may be controlled by either the motorman or the conductor depending upon the type of car. As shown in Fig. 2, each door valve is so arranged that when it is in its door closed position, it establishes communication between the pipe 12 which is connected to the main reservoir 3 and the door closing pipe 13 and between the door opening pipe 14 and the exhaust pipe 15 and when in its door open position it establishes communication between the pipe 12 and the door opening pipe 14 and between the door closing pipe 13 and the exhaust pipe 15. Each door valve is also arranged so that when it is in the door open position, it establishes communication between the exhaust pipe 15 and a pipe 16 which is connected to the safety control pipe 7 at a point between the emergency valve 1 and the double check valve 17 which is provided in the safety control pipe on double-end equipments to cut off communication through the portion of the safety control pipe 7 leading to the non-operating end of the car. Each door engine 10 is of the well known construction whereby the doors controlled thereby are closed when fluid under pressure is supplied to the door closing pipe and the door opening pipe is connected to atmosphere and whereby the doors are opened when fluid under pressure is supplied to the door opening pipe and the door closing pipe is connected to atmosphere.

In order to prevent the safety control pipe 7 from being connected to atmosphere after a straight air application of the brakes has been made and a door valve is moved into the door open position, I provide a suitable cut-off valve 19 in the pipe 16 for cutting off communication between the safety control pipe 7 and the door valves when a straight air application of the brakes is made. The particular cut-off valve shown in the drawing comprises a casing containing a valve 20 which is normally held off its seat by a spring 21 and which is adapted to close communication through the pipe 16. The valve 20 is provided with a stem to which is attached a piston 22 which is adapted to close the valve 20 through the application of straight air pipe pressure to its outer face. Straight air pipe pressure has access to the outer face of the piston 22 through the hold-back valve 23 and a passage 24. Atmospheric pressure has access to the inner face of the piston 22 through the port 25. The hold-back valve 23 is normally held on its seat by a spring 26. When the hold-back valve 23 is on its seat communication is established between an exhaust port 27 and the passage 24 so that the outer face of the piston 22 is connected to atmosphere. When the hold-back valve 23 is moved off of its seat it cuts off communication between exhaust port 27 and passage 24 and establishes communication between the straight air pipe 5 and the passage 24.

The brakes may be controlled in the usual manner by means of the motorman's brake valves 8 and the controller handles 9. Since this operation is well known in the art a complete description thereof is deemed unnecessary.

If it is desired to open one of the doors of the car, the door valve 11 which controls the door is turned to the door open position thereby establishing communication between the main reservoir pipe 12 and the door opening pipe 14 and between the door closing pipe 13 and the exhaust pipe 15 of the door engine which controls the door so that it is operated to open the door. The door valve 11 in its door open position also connects the pipe 16 to atmosphere through the exhaust pipe 15 so that if the cut off valve 19 is in its normal position fluid is vented from the safety control pipe 7 and the emergency valve is operated in the well known manner to effect an emergency application of the brakes. If, however, a straight air application of the brakes is made before the door valve is moved to its door open position the straight air pipe pressure will move the hold-back valve 23 off of its seat so that pressure is supplied through the passage 24 to the outer face of the piston 22. The piston 22 then moves inwardly and closes the valve 20 thereby cutting off communication through the pipe 16 so that fluid is not vented from the safety control pipe 7 when the door valve 11 is moved to its door open position. It will be evident that so long as a straight air application of the brakes is maintained the emergency valve will not be operated by a door valve being moved to its door opening position.

When the brakes are released after a straight air application of the brakes, the pressure in the straight air pipe is exhausted so that the hold-back valve 23 closes and cuts off communication between the straight air pipe 5 and the passage 24 and establishes communication between the passage 24 and the exhaust port 27. The pressure on the outer face of the piston 22 is then exhausted and the valve 20 is opened by the spring 21. It will therefore be evident that if the brakes are released after a straight air application of the brakes and while the doors are still open, an emergency application of the brakes will be effected as soon as the cut off valve 19 opens the communication through pipe 16. If, however, the doors are closed when the brakes are released an emergency application of the brakes will not be effected because the pipe 16 will not be connected to atmosphere.

While I have shown and described one embodiment of my invention, I do not desire to be limited to this specific arrangement, but seek to cover in the appended claims all those modifications which fall within the true scope and spirit of my invention.

What I claim as new and desire to secure by Letters Patent of the United States, is,—

1. In combination with an air brake system comprising an emergency valve adapted to be operated to effect an emergency application of the brakes, and a brake valve arranged to control the operation of said emergency valve, of a door engine, and a door valve adapted in one position to effect the operation of said door engine to open the car doors controlled thereby and to effect the operation of said emergency valve to produce an emergency application of the brakes.

2. In combination with an air brake system comprising means for effecting a straight air application of the brakes, of a door engine, a door valve adapted in one position to effect the operation of said door engine to open the car doors controlled thereby and to effect an emergency application of the brakes, and means adapted to be operated upon a straight air application of the brakes for preventing said door valve from effecting an emergency application of the brakes.

3. In combination with an air brake system comprising an emergency valve adapted to be operated to effect an emergency application of the brakes, and means for effecting a straight air application of the brakes, of a door engine, a door valve adapted in one position to effect the operation of said door engine to open the car doors controlled thereby and to effect the operation of said emergency valve to produce an emergency application of the brakes, and means adapted to be operated upon a straight air application of the brakes for preventing said door valve from effecting the operation of said emergency valve.

4. In combination with an air brake system comprising an emergency valve adapted to be operated to effect an emergency application of the brakes and means for effecting a straight air application of the brakes, of a door engine, a door valve adapted in one position to effect the operation of said door engine to open the car doors controlled thereby and to vent fluid from said emergency valve, and a valve controlling communication through which fluid is vented from said emergency valve to said door valve and operated upon a straight air application of the brakes for closing said communication.

5. In a safety car control equipment, the combination with an emergency valve for effecting an application of the brakes, a safety control pipe, and a controller handle adapted when released to vent fluid from said safety control pipe to operate said emergency valve, of a door engine and a door valve adapted in one position to effect the operation of said door engine to open the car doors controlled thereby and to vent fluid from said safety control pipe.

6. In a safety car control equipment, the combination with an emergency valve for effecting an application of the brakes, a safety control pipe, a controller handle adapted when released to vent fluid from said safety control pipe to operate said emergency valve, and means for effecting a straight air application of the brakes, of a door engine, a door valve adapted in one position to effect the operation of said door engine to open the car doors controlled thereby and to vent fluid from said safety control pipe, and a valve controlling communication through which fluid is vented from said safety control pipe to said door valve and operated upon a straight air application of the brakes for closing said communication.

In witness whereof, I have hereunto set my hand this 12th day of April, 1921.

GEORGE MACLOSKIE.